Patented Sept. 13, 1938

2,130,061

UNITED STATES PATENT OFFICE 2,130,061

MANUFACTURE OF NUCLEOSIDES BY FERMENTATION

Hellmut Bredereck, Leipzig, Germany, assignor to Georg Henning Chem. pharm. Werk G. m. b. H., Berlin-Tempelhof, Germany No Drawing. Application July 16, 1937, Serial No. 154,102. In Germany July 24, 1936

20 Claims. (Cl. 195—29)

This invention relates to a process for the manufacture of nucleosides from nucleic acids by the action of ferments such as enzymes.

It is an object of my invention to devise a process in which nucleosides can be manufactured from nucleic acids with high yields and degrading of the nucleosides is substantially avoided.

It is another object of my invention to reduce the duration of the reaction between a nucleic acid and an enzyme and nevertheless to obtain high yields of nucleosides.

It is a further object of my invention to reduce in the isolation of adenosine from a reaction mixture the losses which till now occurred when decomposing adenosine picrate with sulphuric acid.

The isolation of nucleosides from nucleic acid by fermentation has already been effected in various ways. For this purpose ferments of vegetable origin but, usually, of animal origin have been employed. The ferments which were used not only possessed the property of splitting up nucleic acids into nucleotides, and the latter again into nucleosides, which is an essential property if nucleosides are to be obtained, but also effected deaminization whereby the nucleosides were degraded; nitrogen groups being split off. In spite of the complicated and laborious methods which have been employed by scientific experimenters only exceedingly small yields of nucleosides together with other degradation products, such as inosine, hypoxanthine and the like, have been obtained by the action, for example, of the juices expressed from spinach or Cortinellus edodes or nucleotidases from liver, or intestinal mucus on yeast nucleic acid. The adenosine formed by degrading nucleic acids in this way is isolated in the form of its picrate. When adenosine picrate is decomposed with sulphuric acid, by the methods which have usually been adapted in scientific experiments, which are very complicated and laborious, the losses which occurred were very large; these experimental scientific methods of degrading nucleic acids and working up the products could not therefore be employed commercially for the manufacture of nucleosides and adenosine in particular.

According to my present invention, guanosine, adenosine and other nucleosides are obtained with good yields from nucleic acids by allowing a ferment, which possesses the property of splitting up nucleic acids into nucleotides and of splitting the latter again into nucleosides but does not have deaminization properties, for example, emulsin, to act on nucleic acids at a pH value of 4.0–5.5 and preferably at a slightly elevated temperature of, for example, 30° to 40° C.

The action of the emulsin on the nucleic acid at a hydrogen ion concentration within the limits specified and preferably at incubation temperature is allowed to continue for several days, preferably until the splitting-off of phosphoric acid ceases. According to the purity of the emulsin used, this splitting-off of phosphoric acid ceases after about 8 to 14 or more days. A splitting-off of phosphoric acid can, however, be detected even after a few hours. Such a short period of reaction is however unsuitable for the commercial production of nucleosides.

The duration of the reaction can be considerably reduced by subjecting the nucleic acids, before the reaction with emulsin takes place, to a treatment with alkali for the purpose of effecting some preliminary degrading. For this purpose diluted alkali liquor, the alkali concentration of which preferably amounts to about 2 to 5%, is employed. After heating on the water bath for a few hours, the hydrogen ion concentration is regulated to the necessary pH value, for example by the addition of acetic acid, and emulsin is added. After this preliminary treatment, the time required for the action of the emulsin, until the splitting-off the phosphoric acid ceases, amounts for example to only 10 to 14 days instead of about 16 to 20 days.

By allowing emulsion to act on for example yeast nucleic acid, preferably at a temperature of 30°–40° C. and at pH value between 4.0–5.5 there are produced the nucleosides guanosine, adenosine, uridine and cytidine preformed in yeast nucleic acid. Preferably guanosine and adenosine can be obtained in very high yields. From 100 grams of yeast nucleic acid are obtained: 18 grams of guanosine, 45–50 grams of adenosine picrate, 5 grams of cytidine sulphate and 5 grams of uridine.

Before isolating the adenosine by the formation of its picrate, any guanosine which may have been formed must first be separated from the reaction mixture produced by the fermentation. After this the adenosine picrate is precipitated with picric acid and thereafter decomposed for the purpose of obtaining the free adenosine.

In the scientific experiments which have been referred to, the adenosine was obtained from its picrate by decomposition with sulphuric acid. As I have found the splitting-up of the adenosine picrate is considerably facilitated and the yields are very greatly improved by decomposing the adenosine picrate by a base, and preferably by a base which forms a difficultly soluble picrate, for example caustic potash or ammonia. For example, once when decomposing adenosine picrate with sulphuric acid in the manner described in the "Berichte der deutschen chemischen Gesellschaft," vol. 42, 1909, p. 2704, even when an adenosine picrate which had been twice recrystallized was employed, the yield of adenosine obtained amounted to only 18% of the theoretical. When the decomposition of the adenosine picrate is carried out, in accordance with the invention, for example with potash solution, the yield obtained from an adenosine picrate which had only been recrystallized once was 85% of the theoretical. When crude adenosine picrate obtained from the reaction mixture produced by the fermentation was used, the yields of crystalline adenosine varied between 37 and 66% according to the degree of purity of the crude product.

The precipitation of the adenosine picrate from the reaction mixture produced by the fermentation of nucleic acids after any guanosine which may have been formed has been crystallized out, can be effected with an aqueous solution of picric acid. For this purpose it is generally necessary to evaporate the mixture intensively under vacuum before the addition of the aqueous solution of picric acid to the reaction from which the phosphoric acid can be removed by treatment with baryta water and the excess barium can then be removed by treatment with sulphuric acid. Evaporation of the solution before the precipitation can, however, be wholly or partially dispensed with if, in accordance also with the invention, solid picric acid is added to the solution which has been freed from guanosine and albumen but may in some cases contain some sulphuric acid.

A preferred method of carrying the process of the invention into effect in which on the one hand the action of the emulsin is accelerated by the above described pretreatment with alkali, and on the other hand the evaporation of the solution before the precipitation of adenosine is dispensed with owing to the use of solid picric acid is explained in greater detail with the aid of the following example.

100 grams of yeast nucleic acid are introduced, while shaking, into a warmed mixture of 200 cc. of water and 90 cc. of 2N caustic soda solution. A further quantity of caustic soda solution is added to the mixture on the water bath until the neutral point is reached; a total amount of about 100 cc. is necessary. To the clear solution obtained 11.7 grams of NaOH in 12 cc. of water are added. The solution is then heated on the water bath for two hours. After the solution has been cooled down 40° C., there is added to it a mixture of 500 cc. water and 24 cc. glacial acetic acid which has been heated to 40° C. After the addition of 500 cc. of a filtered ferment solution consisting of 10 grams emulsin and a few drops of toluene the solution is placed in the incubator at a temperature of 37° C. and is shaken up daily.

After 12 to 14 days, the solution in which a thick precipitate of guanosine has formed is placed overnight in the ice chest, it is then filtered and washed with water, alcohol and ether. The yield of crude guanosine amounts to 20 to 25 grams.

The filtrate from the guanosine is boiled up and cooled down again, after which the albumen which precipitates is filtered off. The filtrate is freed from phosphoric acid by the addition of baryta water and then from excess barium by the addition of sulphuric acid; it is then evaporated until the volume of the filtrate before the addition of baryta is reached again, heated to 50° C. and 50 grams of dry picric acid are stirred in. The picric acid dissolves at once and is precipitated again as adenosine picrate. After standing for several hours in the ice chest, the picrate separates completely in a form in which it filters well. It is filtered off and well washed with water, alcohol and ether. A yield of 45 to 50 grams of picrate is obtained.

The dry picrate is crushed, and treated in an Erlenmeyer flask with three times its quantity of water and heated to a temperature of 55° C. on the water bath. To the homogeneous mass obtained there is added, while stirring, a concentrated potash solution (2.6 g. KOH in 5 cc. water for each 20 g. of picrate) and the mixture is shaken up, until the potassium picrate on settling down gives a clear solution. After standing in ice water for about half an hour, the potassium picrate is filtered off and washed with a small quantity of water and the filtrate is seeded with adenosine which immediately begins to crystallize. After standing overnight in the ice chest, the paste formed is filtered and washed first with a small quantity of water and then repeatedly with acetone until the yellow coloration has disappeared. A yield of 10–12 grams of crude adenosine, or 8–10 grams of pure adenosine after recrystallization from water, is obtained.

For decomposing the crude adenosine picrate, an aqueous solution of ammonia (about 12 cc. of a 25% solution) can be employed with equal success in place of the potash solution.

From the filtrate obtained after the precipitation of the adenosine with picric acid, the nucleosides, cytidine and uridine which are formed by the degrading process in addition to guanosine and adenosine can be obtained by known methods. Yields of cytidine sulphate about 5 grams and of uridine about 5 grams.

While I have herein shown and described certain preferred embodiments of my invention, I wish it to be understood that I do not confine myself to all the precise details herein set forth by way of illustration, as modification and variation may be made without departing from the spirit of the invention.

What I claim is:

1. A process for the production of nucleosides by degrading nucleic acids by means of a ferment, which comprises regulating the hydrogen ion concentration of the nucleic acid to a pH value between 4.0–5.5, treating it with emulsin and separating the nucleosides desired.

2. A process for the production of nucleosides by degrading nucleic acids by means of a ferment, which comprises regulating the hydrogen ion concentration of the nucleic acid to a pH value between 4.0–5.5, treating it with emulsin at a temperature of about 30–40° C. and separating the nucleosides desired.

3. A process according to claim 1 in which the emulsin is allowed to act on the nucleic acid for several days.

4. A process according to claim 1 in which the emulsin is allowed to act on the nucleic acid until the splitting-off of phosphoric acid ceases.

5. A process for the production of nucleosides by degrading nucleic acids which comprises treating the nucleic acid with a dilute alkali solution, regulating the hydrogen ion concentration of the solution obtained to a pH value between 4.0–5.5, treating it with emulsin, and separating the nucleosides formed.

6. A process for the production of nucleosides by degrading nucleic acids which comprises treating the nucleic acid with a dilute alkali solution, regulating the hydrogen ion concentration of the solution obtained to a pH value between 4.0–5.5, and treating the said solution with emulsin at a temperature of about 30–40° C.

7. A process according to claim 6 in which the emulsin is allowed to act on the solution for several days.

8. A process for the production of nucleosides by degrading nucleic acids, which comprises subjecting nucleic acid of which the pH value has been adjusted to lie between 4.0–5.5 to the action of emulsin, precipitating the adenosine produced in the form of picrate and decomposing the picrate with a basic substance.

9. A process for the production of nucleosides by degrading nucleic acids which comprises subjecting nucleic acid of which the pH value has been adjusted to lie between 4.0–5.5 to the action of emulsin at a temperature of from 30–40° C., crystallizing out the guanosine formed, precipitating the adenosine produced in the form of picrate and decomposing the picrate with a base.

10. A process for the production of nucleosides by degrading nucleic acids, which comprises subjecting the nucleic acid at a pH value of from 4.0–5.5 to the action of emulsin until the splitting-off of phosphoric acid substantially ceases, precipitating the adenosine formed as picrate and decomposing the adenosine picrate with a basic substance.

11. A process according to claim 8 in which the adenosine picrate is decomposed with caustic potash.

12. A process according to claim 9 in which the adenosine picrate is decomposed with caustic potash.

13. A process for the production of nucleosides by degrading nucleic acids, which comprises treating the nucleic acid with dilute alkali, regulating the pH value to be from 4.0–5.5, subjecting it to the action of emulsin, precipitating the adenosine formed as picrate and decomposing the adenosine picrate with a base which forms a difficultly soluble picrate.

14. A process for the production of nucleosides by degrading necleic acids, which comprises subjecting the nucleic acid at a pH value of from 4.0–5.5 to the action of emulsin precipitating the adenosine produced by the addition of solid picric acid, and decomposing the picrate with a base.

15. A process for the production of nucleosides by degrading nucleic acids which comprises treating the nucleic acid with a dilute alkali solution, regulating the hydrogen ion concentration of the solution obtained to a pH value between 4.0–5.5, treating it with emulsin, crystallizing out the guanosine formed, freeing the solution from albumen, precipitating the adenosine formed by the addition of solid picric acid, and decomposing the picrate with a base.

16. A process for the production of nucleosides by degrading nucleic acids which comprises treating the nucleic acid with a dilute alkali solution at elevated temperature, regulating the hydrogen ion concentration of the solution obtained to a pH value between 4.0–5.5, subjecting the solution to the action of emulsin for several days and at a temperature of from 30–40° C., crystallizing out the guanosine formed, freeing the solution from albumen, precipitating the adenosine formed by the addition of solid picric acid and decomposing the picrate with a base which forms a difficultly soluble picrate.

17. A process according to claim 16 in which the adenosine picrate is decomposed by caustic potash.

18. A process according to claim 16 in which the adenosine picrate is decomposed by an aqueous solution of ammonia.

19. A process according to claim 8 in which the adenosine picrate is decomposed with an aqueous solution of ammonia.

20. A process according to claim 9 in which the adenosine picrate is decomposed with ammonia.

HELLMUT BREDERECK.